United States Patent
Ouvrier-Buffet et al.

(10) Patent No.: US 8,772,718 B2
(45) Date of Patent: Jul. 8, 2014

(54) ELECTROMAGNETIC RADIATION DETECTING DEVICE COMPRISING AN ACTIVE BOLOMETER AND A SHIELDED REFERENCE BOLOMETER

(75) Inventors: Jean-Louis Ouvrier-Buffet, Sevrier (FR); Jerome Meilhan, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 219 days.

(21) Appl. No.: 13/270,633

(22) Filed: Oct. 11, 2011

(65) Prior Publication Data

US 2012/0097853 A1    Apr. 26, 2012

(30) Foreign Application Priority Data

Oct. 26, 2010    (FR) ..................................... 10 04202

(51) Int. Cl.
*G01J 5/00* (2006.01)
*G01J 5/12* (2006.01)
*G01J 5/04* (2006.01)
*G01J 5/02* (2006.01)
*G01J 5/20* (2006.01)
G01J 5/06 (2006.01)

(52) U.S. Cl.
CPC .. *G01J 5/06* (2013.01); *G01J 5/045* (2013.01); *G01J 5/12* (2013.01); *G01J 5/04* (2013.01); G01J 2005/068 (2013.01); *G01J 5/02* (2013.01); *G01J 5/20* (2013.01); *G01J 5/0285* (2013.01); G01J 2005/065 (2013.01)
USPC ........................................ 250/338.1; 250/349

(58) Field of Classification Search
CPC ..................... G01J 2005/068; G01J 2005/067; G01J 2005/06; G01J 2005/065; G01J 2005/02; G01J 2005/066; G01J 5/14; G01J 5/12; G01J 5/20; G01J 5/02; G01J 5/0285; G01J 5/04; G01J 5/06; G01J 5/045
USPC .......... 250/338.4, 338.1, 336.1, 208.1, 208.2, 250/214 R, 214.1, 239, 339.02, 338.3; 257/660, 678, 684; 374/1, 9, 12
See application file for complete search history.

(56) References Cited

U.S. PATENT DOCUMENTS

| | | | |
|---|---|---|---|
| 6,245,591 B1 * | 6/2001 | Beratan et al. | 438/55 |
| 2001/0035559 A1 | 11/2001 | Ando et al. | |
| 2004/0162470 A1 * | 8/2004 | Tu | 600/316 |
| 2007/0138395 A1 | 6/2007 | Lane et al. | |
| 2007/0293108 A1 * | 12/2007 | Kubota | 442/179 |

(Continued)

FOREIGN PATENT DOCUMENTS

WO    WO 2006/120362 A1    11/2006

*Primary Examiner* — David Porta
*Assistant Examiner* — Yara B Green
(74) *Attorney, Agent, or Firm* — Oliff PLC (57) ABSTRACT

A device for detecting electromagnetic radiation that comprises an active bolometer provided with a first element sensitive to said electromagnetic radiation and a reference bolometer identical to the active bolometer, provided with a second element sensitive to said electromagnetic radiation. The active bolometer and reference bolometer are arranged close to one another on the same substrate. A cover covers at least the part of the second sensitive element exposed to the electromagnetic radiation and arranges an empty space between said second sensitive element and the cover. The inner wall of the cover is constituted by an absorbent layer made from a material absorbing at least the thermal radiations emitted by the second sensitive element. A reflecting shield forms at least a part of the outer wall exposed to said electromagnetic radiation.

13 Claims, 9 Drawing Sheets

(56) References Cited

U.S. PATENT DOCUMENTS

| | | | |
|---|---|---|---|
| 2008/0202209 A1* | 8/2008 | Lambkin et al. | 73/31.05 |
| 2009/0213895 A1* | 8/2009 | Pillans | 374/2 |
| 2010/0133536 A1* | 6/2010 | Syllaios et al. | 257/53 |

* cited by examiner

ELECTROMAGNETIC RADIATION DETECTING DEVICE COMPRISING AN ACTIVE BOLOMETER AND A SHIELDED REFERENCE BOLOMETER

BACKGROUND OF THE INVENTION

The invention relates to a device for detecting electromagnetic radiation that comprises:
- an active bolometer equipped with a first element sensitive to said electromagnetic radiation,
- a reference bolometer identical to the active bolometer, equipped with a second element sensitive to said electromagnetic radiation, said active and reference bolometers being arranged near to one another on the same substrate,
- a cover having an outer wall and an inner wall facing towards the second sensitive element, said cover covering at least the part of the second sensitive element exposed to the electromagnetic radiation and arranging an empty space between said second sensitive element and the cover and,
- a reflecting shield forming at least a part of the outer wall exposed to said electromagnetic radiation.

STATE OF THE ART

Figure 1:
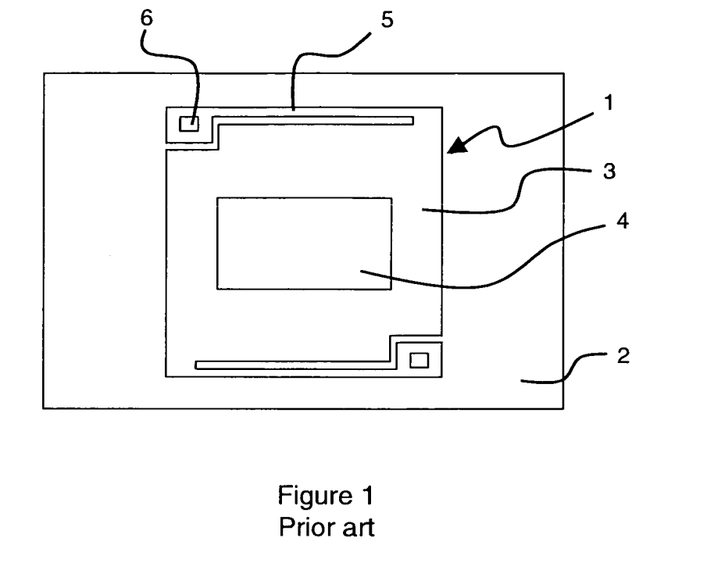
FIGS. 1 and 2 schematically represent a bolometric detector of the prior art, in top view and perspective view.
Figure 2:
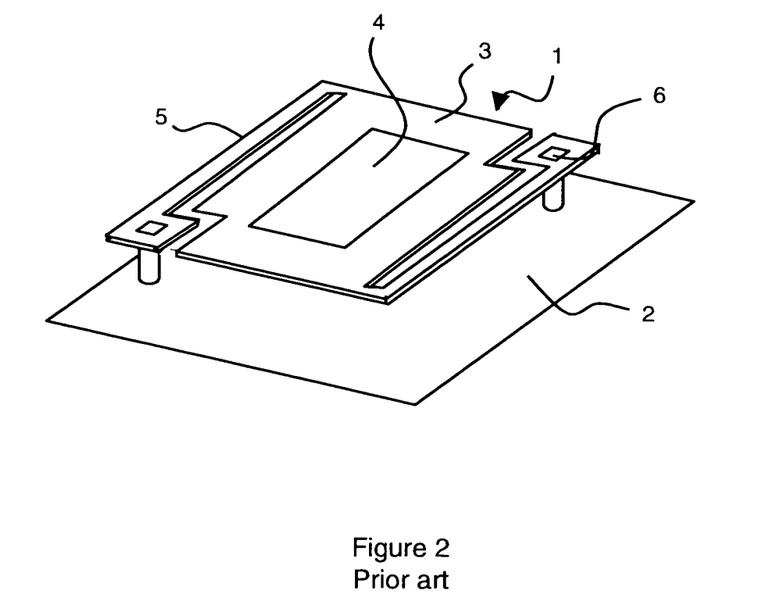

Bolometers enable the power of electromagnetic radiation in the terahertz range or of infrared rays to be measured by conversion of the radiation into an electric signal. As illustrated in FIGS. 1 and 2, a bolometric detector of resistive type comprises a bolometric plate 1 suspended above a substrate 2. Bolometric plate 1 is constituted by a membrane 3 absorbing electromagnetic radiation and by a thermistor 4 constituted by a heat-sensitive semi-conductor material, the essential characteristic of which is to present a variation of its electric resistance when its temperature varies. Membrane 3 is suspended by means of thermal insulation arms 5 fixed to substrate 2 by anchorage points 6. Membrane 3 absorbs the incident radiation, transforms the latter into heat and transmits the heat to a thermistor 4. The temperature rise of thermistor 4 then induces a voltage or current variation at the terminals of the bolometric detector, measured by a suitable electric assembly. Electrodes (not shown) are for example arranged at the level of anchorage points 6. In conventional manner, a read circuit is integrated in substrate 2 and makes use of the measurements made. Thermal insulation arms 5 insulate membrane 3 thermally from substrate 2 thereby improving the sensitivity of measurement.

Quality operation of the bolometric detector requires three main conditions to be met: a low calorific mass, good thermal insulation of membrane 3 from substrate 2 and a good sensitivity of the conversion effect of the temperature rise into an electric signal. The first two conditions are obtained by implementation of the bolometric detector in thin layers.

Monolithic infrared imagery devices operating at ambient temperature are fabricated by connecting a matrix of bolometric detectors directly to a multiplexing circuit made from silicon of CMOS or CCD type.

The read principle of a bolometric detector consists in measuring the value of the resistance of thermistor 4 and the variations thereof. When these variations are very small, in particular for infrared detection (IR), the detected signal is amplified within the read circuit via a high-gain amplifier or integrator stage. In general manner, the integrator stage is privileged as it intrinsically reduces the passband and thereby eliminates white noise.

In the case of the integrator, the current originating from the bolometric detector rapidly saturates the output signal of a read-out integrated circuit (ROIC). The useful current containing the information of the scene then only represents a fraction of the total integrated current. To increase the read sensitivity, the invariant fraction of the current is conventionally shunted to a branch of the circuit called "skimming" branch, which sends only the variable part of the current corresponding to the imaged scene to the integrator.

Figure 3:
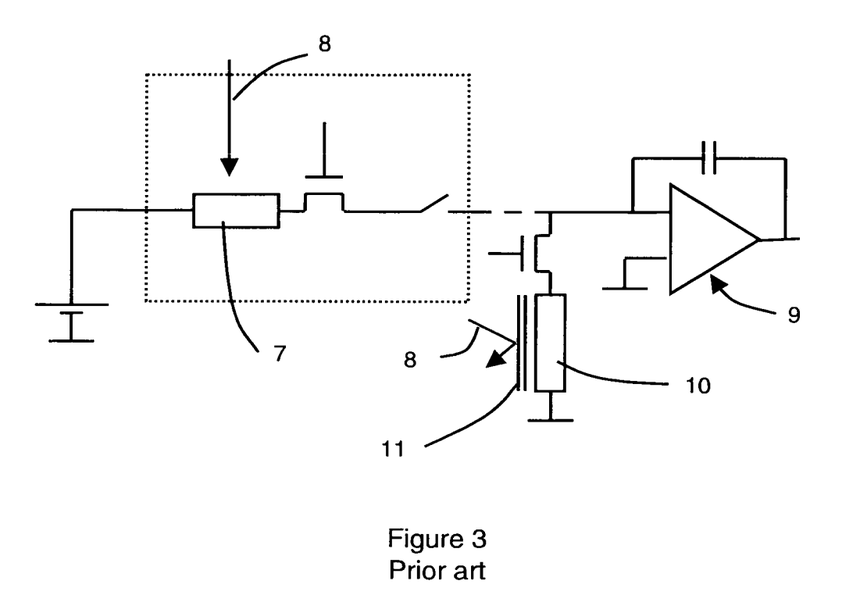
FIG. 3 schematically represents the read principle of a bolometer-based electromagnetic radiation detection device according to the prior art.

FIG. 3 illustrates the read principle of a bolometer-based detection device. The device comprises an active bolometer 7 which absorbs an incident electromagnetic radiation 8 and enables the latter to be measured. The variation of the resistance of active bolometer 7 is representative of the value of this radiation 8. Current read is frequently used to make this measurement. The current, on output of active bolometer 7, comprises a variable fraction and an invariant fraction. The detection device in fact operates in relative manner, i.e. it detects an invariant continuous background signal, which can impinge on measurement of the useful variable signal, which is in general small compared with this background signal. It is therefore desirable to eliminate this invariant fraction of the current to obtain optimal measurement of the radiation value.

To increase the read sensitivity, the invariant fraction of the current is preferably shunted in a shunt branch so that only the variable part of the current, called offset current, is sent to an integrator 9. In electronics terms, the element that acts as shunt branch has to present a low noise so as to generate as little disturbance as possible. For this, the shunt branch is formed by a resistor of sufficiently high value biased by direct injection. What is meant by direct injection is that the electrons originating from the resistor are injected directly into a transistor which performs biasing of the resistor and adjustment of the detector bias.

A conventional solution consists in using a reference bolometer 10 as shunt branch, i.e. a bolometer 10 that does not detect electromagnetic radiation 8.

The shunt branch therefore comprises a reference bolometer 10, as represented in FIG. 3, which is blinded by a protective shield 11 placed between electromagnetic radiation 8 and reference bolometer 10. Reference bolometer 10 is thus transformed into a passive bolometer which does not absorb any radiation and acts as reference.

The efficiency of this type of detection device depends on the characteristics of reference bolometer 10 and on its ability to be totally blind.

For example purposes, the document US-A-2007138395 proposes a thermal detector that comprises a first cell that provides a signal dependent on the intensity of the incident radiation and a second cell used to calibrate the output signal of the first cell. Each cell contains an infrared detector formed on a single substrate and has a cover totally encapsulating the detector. The second cell is configured to prevent transmission of radiation through the cover and to the detector. In particular, the cover has a reflecting screen. The reflecting screen is arranged on the top surface of the cover, the top surface being parallel to the substrate. This reflecting screen enables the second cell to be rendered optically opaque. The output signal of the second cell is independent from the incident radiation and is used as reference signal to calibrate the output signal of the first cell.

Nevertheless, the use of a reflecting screen above the reference structure is not sufficient to optimally eliminate the offset current and to detect very weak signals, for example for IR imagery devices which require the use of high IR imagery scene signal detection gains. To obtain a high gain on the detector response, the bolometric resistance is in fact generally biased in pulsed manner.

However, during the biasing pulse, a self-heating phenomenon of the bolometer is observed caused by Joule effect dissipation within the material constituting thermistor 4. The offset current then varies significantly due to this thermal radiation phenomenon.

A subtraction architecture of the offset via a DC current then proves to be a handicap when resolving the low electromagnetic radiation flux signal is involved. The s elf-heating phenomenon induces a saturation of the ROIC which limits the usable gain and does not enable optimal performance of the bolometer to be accessed.

OBJECT OF THE INVENTION

The object of the invention is to provide a detection device enabling reliable and precise measurement of an electromagnetic radiation, in particular an optimized device enabling an IR imagery scene signal to be amplified as best as possible, with high gains and an improved offset current skimming.

According to the invention, this object is achieved by an electromagnetic radiation detection device according to the indexed claims.

In particular, this object is achieved by the fact that the inner wall of the cover is constituted by an absorbent layer, said layer being made from a material absorbing at least the thermal radiations emitted by the second sensitive element.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS OF THE INVENTION

Figure 4:
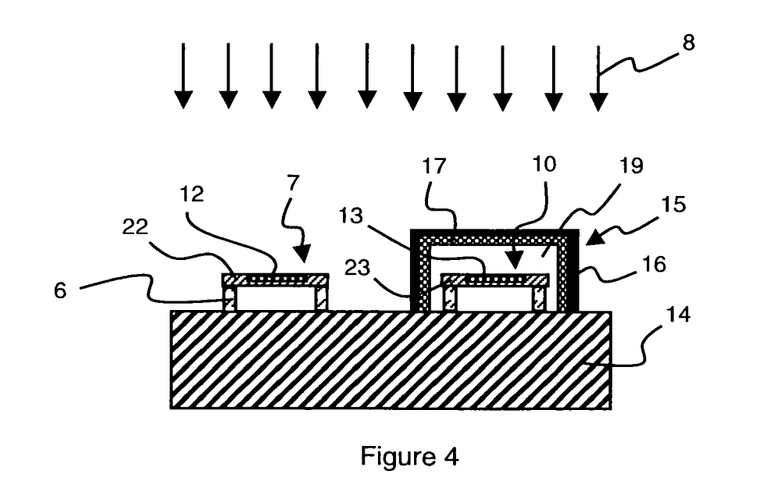
FIG. 4 schematically represents an electromagnetic radiation detection device according to the invention, in cross-section.

As represented in FIG. 4, a device for detection of an electromagnetic radiation 8 comprises an active bolometer 7 provided with a first element 12 sensitive to said electromagnetic radiation 8 and a reference bolometer 10 identical to active bolometer 7 and provided with a second element 13 sensitive to said electromagnetic radiation 8. What is meant by identical is strictly identical, i.e. that reference bolometer 10 is constituted by identical materials to those of active bolometer 7 and has the same architecture and identical dimensions. Reference bolometer 10 thus varies with temperature in identical manner.

The active bolometer and reference bolometer, respectively 7 and 10, are arranged on the same substrate 14 and in proximity to one another.

Substrate 14 is a support conventionally made from silicon. It ensures the mechanical strength of the active bolometer and of the reference bolometer, respectively 7 and 10, and preferably comprises biasing and read devices of the thermistor resistance (not shown). In particular, in the case of an IR detection device comprising several microbolometers with a matrix structure, it can also comprise multiplexing components enabling the signals originating from the different microbolometers to be serialized and to transmit them to a reduced number of outputs in order to be used by a usual imagery system.

As represented in FIG. 4, active bolometer 7 and reference bolometer 10 advantageously have an insulating structure with microbridges, each structure comprising anchorage points 6 and thermal insulation arms 5 (FIG. 2) in order to minimize heat conduction. The microbridge structure has a high thermal resistance. A high thermal resistance enables the variation of the electric resistance to be maximized. The thermal mass is adjusted so as to be compatible with the required thermal time constant at the level of the system. This structure thereby reduces the response time of the signals emitted by the detection device and improves the signal-to-noise ratio.

The detection device also comprises a cover 15 which covers at least the part of second sensitive element 13 exposed to electromagnetic radiation 8 and arranges an empty space between second sensitive element 13 and cover 15. Cover 15 can be located only above-second sensitive element 13 (at the top in FIG. 4), without completely covering reference bolometer 10. Cover 15 then creates an open cavity 19. Cover 15 is arranged on the optic path of electro-magnetic radiation 8, between the radiation source and second sensitive element 13. A shielded reference bolometer 10 will then be referred to, i.e. provided with a cover 15 forming a shield.

Cover 15 has an outer wall 16 and an inner wall 17. Inner wall 17 is facing towards second sensitive element 13 and outer wall 16 is facing towards the scene emitting electromagnetic radiation 8.

To achieve optimum operation, active bolometer 7 and reference bolometer 10 advantageously have to be identical, or at least comparable, in terms of electric resistance and thermal time constant. What is meant by thermal time constant is the time the bolometer takes to go from one temperature to another due to the effect of a variation of incident electromagnetic radiation 8.

The thermal time constant is the product of the thermal mass by the thermal resistance of the bolometer. What is meant by thermal mass is the capacity of a material to store thermal energy and to then emit the latter by radiation (radiative losses), convection or conduction.

The thermal mass and electric resistance are intrinsic characteristics of the bolometer that depend on the nature of the materials constituting the bolometer and on its architecture. The active and reference bolometers, respectively 7 and 10, being identical, the thermal mass and electric resistance of active bolometer 7 are consequently identical to those of reference bolometer 10.

The thermal resistance on the other hand depends on the radiative losses which quantify terminal heat exchanges between the bolometer and its environment.

More particularly, the thermal resistance comprises two components, a first component resulting from the heat exchanges between bolometric plate 1 and anchorage point 6, by conduction through thermal insulation arms 5, and a second component depending on the radiative losses which quantify the heat exchanges of the bolometer with its environment.

The environment of the bolometer determining an amplitude of the radiative heat exchanges consequently influences the value of the thermal time constant.

Figure 5:
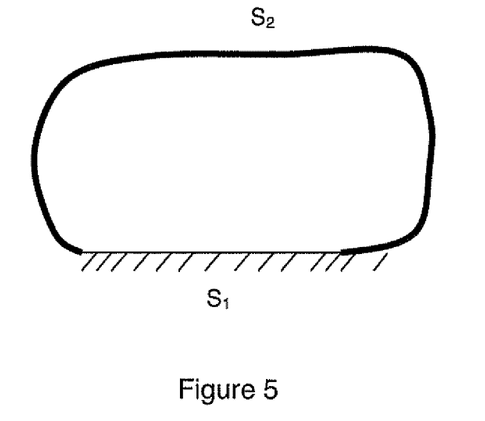
FIG. 5 is a schematic representation of the heat exchange principle between two surfaces $S_1$ and $S_2$.

Each surface in fact, by principle, emits thermal radiations in all the directions of the space and receives radiations which originate from the other surfaces that surround it. As illustrated in FIG. 5, in the scope of heat fluxes exchanged by two surfaces $S_1$ and $S_2$, the heat exchanges are expressed by the following equation (1):

$$\frac{\Phi_{12}}{S_1} = \frac{\varepsilon_1 \varepsilon_2}{1 - \left(1 - \varepsilon_1 \frac{S_1}{S_2}\right)(1-\varepsilon_2) + \varepsilon_1 \varepsilon_2 \frac{F_{11}}{F_{12}}} (\sigma(T_1^4 - T_2^4)) \quad (1)$$

in which:

$\varepsilon_1$, and $\varepsilon_2$ are the respective emissivity of surfaces $S_1$ and $S_2$,
$\phi_{12}$ is the density of the radiative flux exchanged between surface $S_1$ and surface $S_2$,
$T_1$ and $T_2$ are the respective temperatures of the two surfaces $S_1$ and $S_2$ and,
$F_{11}$ and $F_{12}$ are the form factors under which $S_1$ sees itself and sees $S_2$.

For a flat surface $S_1$ as represented in FIG. 5, factor $F_{11}$ is equal to 0.

A conventional bolometer covered only by a case can be respectively schematized by surfaces $S_1$ (flat) and $S_2$ (FIG. 5). The dimensions of the case being large both in comparison with the distance from the bolometer to the case and in comparison with those of the bolometer, equation (1) of the heat flux output from bolometer $S_1$ in the direction of case $S_2$ is simplified to give the following equation (2):

$$\frac{\Phi_{12}}{S_1} = \varepsilon_1(\sigma(T_1^4 - T_2^4)) \quad (2)$$

with $S_1/S_2 \ll 1$ and $F_{12} \approx 1$.

The case located at a distance from the bolometer therefore behaves as a black surface.

On the other hand, in the case of a reference bolometer 10 present in proximity to the case, the ratio $S_1/S_2$ being comprised between about 1 and 2 is no longer negligible. By entering the value $F_{12}$ close to 1 and the ratio $S_1/S_2$ in equation (1), it can be observed that the presence of the case considerably modifies the heat flux density.

The presence of a cover 15 in proximity to reference bolometer 10 and in particular to second sensitive element 13 can modify the thermal resistance of reference bolometer 10.

Furthermore, the influence of cover 15 on the thermal resistance depends on the distance that separates this cover 15 from reference bolometer 10. Active bolometer 7 thus sees a different environment from that of reference bolometer 10. The presence of cover 15 explains a difference of thermal resistance observed between active bolometer 7 and reference bolometer 10, in spite of the fact that bolometers 7 and 10 are identical.

According to this principle, provided that the architecture of reference bolometer 10 remains identical to that of active bolometer 7, the only possibility for the heat flux exchanged by reference bolometer 10 to be identical, or at least comparable, with that exchanged by active bolometer 7 is to choose a cover 15 constituted by a material behaving as a black body, i.e. having an emissivity equal to 1 ($\varepsilon_2 = 1$) and heated to the same temperature as the focal plane and the case.

Outer wall 16 of cover 15 exposed to electromagnetic radiation 8 also has to be reflecting and be constituted by very a good heat-conducting material.

Cover 15 on the one hand has to perfectly absorb the thermal radiations on inner wall 17 facing reference bolometer 10 and on the other hand to be perfectly reflecting on outer wall 16 of cover 15, facing the scene emitting electromagnetic radiation 8.

To achieve this, reflecting shield 18 forms at least a part of outer wall 16 exposed to electromagnetic radiation 8. Reflecting shield 18 is conventionally constituted by a reflecting thin layer formed by at least one material having good reflecting properties and being a good heat conductor.

The whole of outer wall 16 of cover 15 is advantageously constituted by reflecting shield 18 (FIG. 4).

In alternative manner, reflecting shield 18 only forms the part of outer wall 16 exposed to electromagnetic radiation 8. More precisely, reflecting shield 18 only forms the part of outer wall 16 parallel to the substrate.

Reflecting shield 18 prevents transmission of electromagnetic radiation 8 through cover 15 to reference bolometer 10. Reference bolometer 10 is insensitive to electromagnetic radiation 8.

Reflecting shield 18 is advantageously formed by at least one metal material chosen from aluminum, titanium, gold, nickel, and copper and aluminum alloys.

The detection device is preferably a detection device of IR and of Terahertz (THz).

Cover 15 presses on substrate 14 and forms with substrate 14 an open or closed cavity 19 in which reference bolometer 10 is housed.

According to a particular embodiment, cover 15 totally encapsulates second sensitive element 13.

Figure 6:
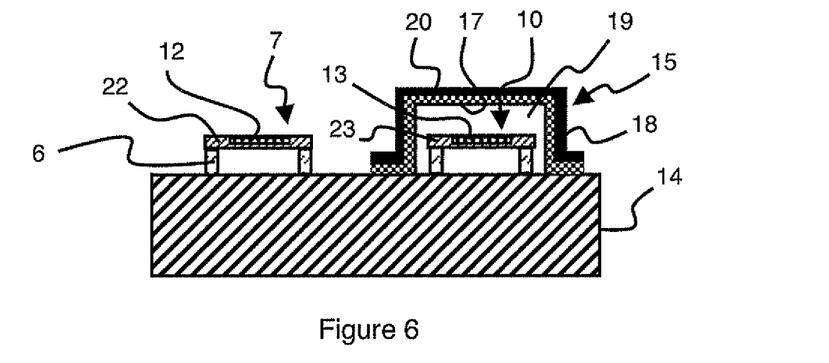
FIG. 6 schematically represents a particular embodiment of the device according to the invention, in cross-section.
Figure 7:
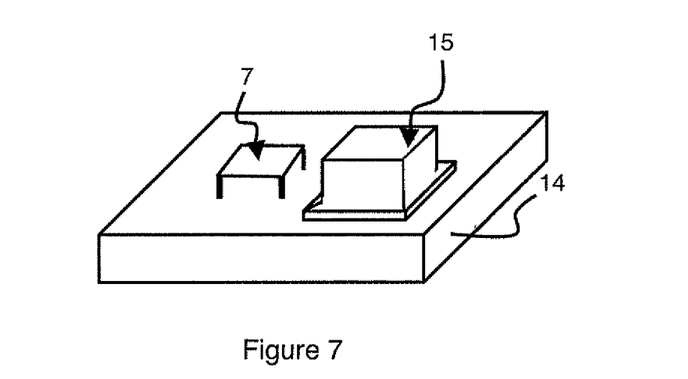
FIG. 7 schematically represents a detection device according to FIG. 6, in perspective view.

As represented in FIGS. 6 and 7, cover 15 can totally encapsulate reference bolometer 10 located in cavity 19. Cavity 19 which is then closed is delineated by cover 15 at the top part (at the top of FIG. 6) and by substrate 14 at the bottom part (at the bottom of FIG. 6).

Cover 15 preferably totally covers reference bolometer 10 without being in contact with the latter. Cover 15 thus forms a capsule which creates a closed and possibly tightly, sealed cavity 19 in which reference bolometer 10 is housed (FIGS. 6 and 7).

Cover 15 can also form a rim pressing on substrate 14 which extends over a part of substrate 14. As illustrated in FIG. 7, the rim is present all around the capsule improving the adhesion and, eventually, the tightness of cover 15.

Inner wall 17 of cover 15 is constituted by an absorbent layer 20 so that the closed cavity 19 constitutes an absorbent cavity. More precisely, the whole of inner wall 17 is constituted by absorbent layer 20 to absorb the radiations coming from second sensitive element 13. The absorbent material constituting absorbent layer 20 covers the whole of inner wall 17 of cover 15. Absorbent layer 20 is made from a material absorbing at least the thermal radiations emitted by second sensitive element 13, preferably by the whole of reference bolometer 10. When the detection device is in operation, second sensitive element 13 in fact heats and emits radiations which are then absorbed by absorbent layer 20.

Absorbent layer 20 is advantageously formed by at least one porous absorbent metallic material chosen from black gold, platinum, silver and chromium. Black gold and platinum are commonly used in the field of pyroelectric or thermopile detection devices of silver and chromium to elaborate the black absorbers.

Thermalization of the bolometer, i.e. the temperature that reference bolometer 10 will take, is a consequence of the losses by thermal conduction via the thermal insulating arms 5 to which the losses by radiation that are governed by inner wall 17 constituted by a black body are added.

According to an alternative embodiment, absorbent layer 20 is formed by at least one polymer material containing graphite. Polymer materials containing graphite can absorb up to 80% between 2 µm and 20 µm. The term polymer also covers polymer resins of epoxy or polyimide type and photosensitive resins.

To improve the absorption capacity of absorbent layer 20, the latter can also be made in the form of a multilayer and/or comprise several absorbent materials of different natures.

Reference bolometer 10 having cover 15 described above then presents a thermal resistance identical or at least comparable to that of active bolometer 7.

The electromagnetic radiation detection device described above can be fabricated in elementary form or on a wafer in collective manner in the scope of a vacuum encapsulation process of the detection devices.

According to the particular embodiments represented in FIGS. 4 and 6, the detection device comprises a non-shielded active bolometer 7 and a reference bolometer 10 shielded by cover 15.

A particular embodiment of such a detection device of electromagnetic radiation 8 will be described in greater detail with respect to FIGS. 8 to 13.

The characteristics of active bolometer 7 and of reference bolometer 10 can be slightly changed depending on their fabrication conditions, in particular for miniaturized IR detection devices. These differences of characteristics then give rise to measurement errors, in particular in the case of precise measurements of the temperature change of a thermistor 4 (FIG. 2). To improve the precision of the measurements and in particular to prevent this type of error, active bolometer 7 and reference bolometer 10 are preferably formed simultaneously on the same substrate 14.

Figure 8:
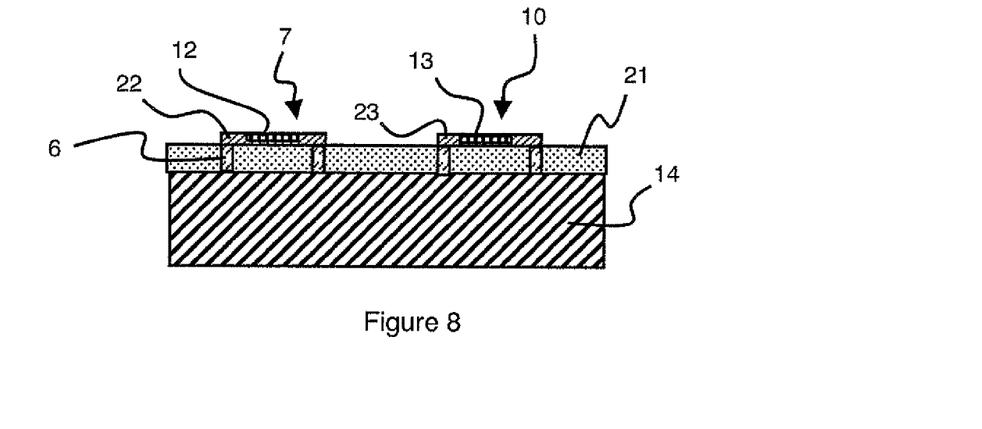
FIGS. 8 to 13 schematically represent the different steps of a fabrication method of the detection device according to FIG. 4, in cross-section.

As represented in FIG. 8, the detection device fabrication method first comprises deposition, on the substrate 14 comprising anchorage points 6, of a first sacrificial layer 21, preferably made from polyimide, with a thickness approximately equal to the thickness of anchorage points 6 of active and reference bolometers 7 and 10. Bolometric plates 22 and 23 respectively comprising first sensitive element 12 and second sensitive element 13 are then made in conventional manner to form active and reference bolometers respectively 7 and 10.

Figure 9:
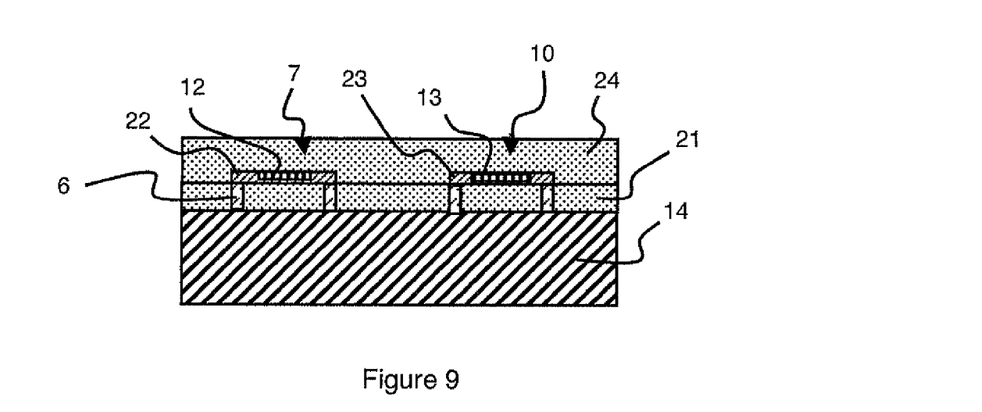

As represented in FIG. 9, a second sacrificial layer 24, preferably made from polyimide, is then deposited on first sacrificial layer 21 and on bolometric plates 22 and 23. The heat treatments introduced by this deposition must not impair the performances of active and reference bolometers 7 and 10.

Figure 10:
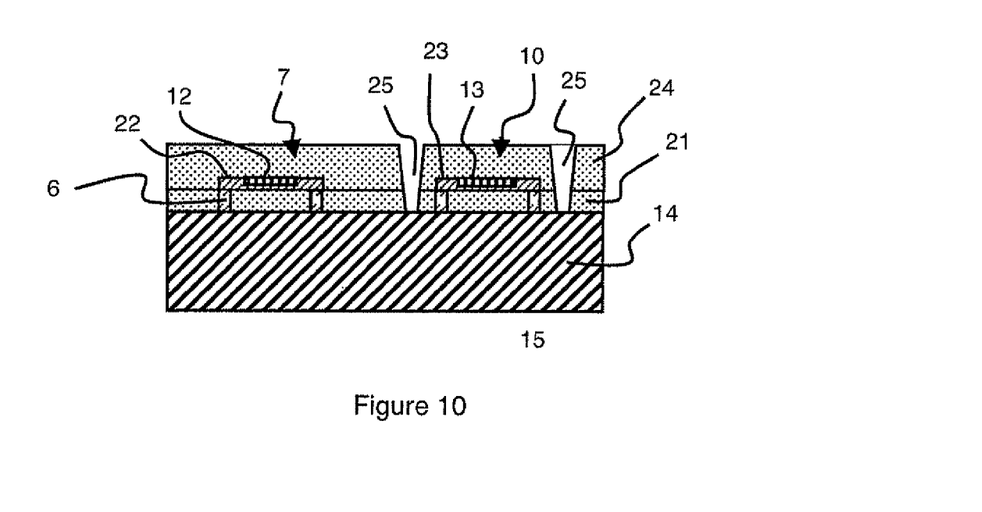

The thickness of second sacrificial layer 24 is comprised between 0.5 µm and 5 µm so as to form the empty space above second sensitive element 13 and to make cover 15 at a distance above reference bolometer 10 also comprised between 0.5 µm and 5 µm In FIG. 10, etching of the first and second sacrificial layers, respectively 21 and 24, is then performed facing the reference bolometer 10. A recess 25 is etched according to the required shape of cover 15 all around reference bolometer 10. Recess 25 thus forms a continuous trench that surrounds reference bolometer 10 and passes through the whole thickness of first and second sacrificial layers, respectively 21 and 24.

Figure 11:
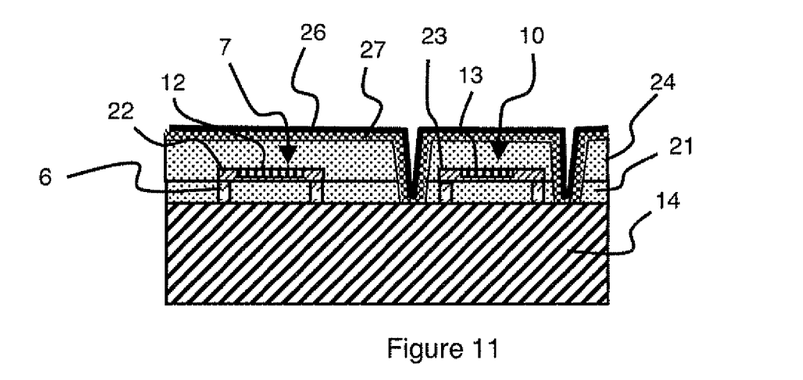

As represented in FIG. 11, different layers constituting cover 15 are then successively deposited on second sacrificial layer 24 in the form of thin layers by means of any known method. What is meant by thin layers are layers having a thickness comprise between 0.005 µm and 1 µm.

The layers are constituted for example by a first metal layer 26 deposited on second layer 27 of absorbent material. In all cases, first and second layers, respectively 26 and 27, are chosen such that cover 15 presents the necessary optic and thermal properties to perform reflection of electromagnetic radiation 8 and absorption of the thermal radiations emitted by reference bolometer 10 resulting from the power dissipated by Joule effect when the latter is operating.

Deposition of the thin layers is performed by cathode sputtering, by low-pressure chemical vapor deposition (LPCVD) or by plasma-enhanced chemical vapor deposition (PECVD).

For example purposes, a second layer 27 of black gold can be produced by evaporation of black gold under reduced nitrogen pressure comprised between 2 mbar and 20 mbar.

A second layer 27 of platinum can be deposited by means of conventional electrochemical techniques.

Deposition of a second layer 27 of chromium can be achieved for example by sputtering in the presence of an argon (Ar)/oxygen ($O_2$) mixture under the following conditions:
Pressure comprised between 1 mTorr and 20 mTorr,
Ar/$O_2$ ratio comprised between 20:1 and 10:1 and,
Power per surface unit comprised between 0.12 W/cm$^2$ and 2 W/cm$^2$.

Likewise, deposition of a second layer 27 of silver can be performed by evaporation in the presence of argon or nitrogen, under a pressure comprised between 75 mTorr and 750 mTorr.

Figure 13:
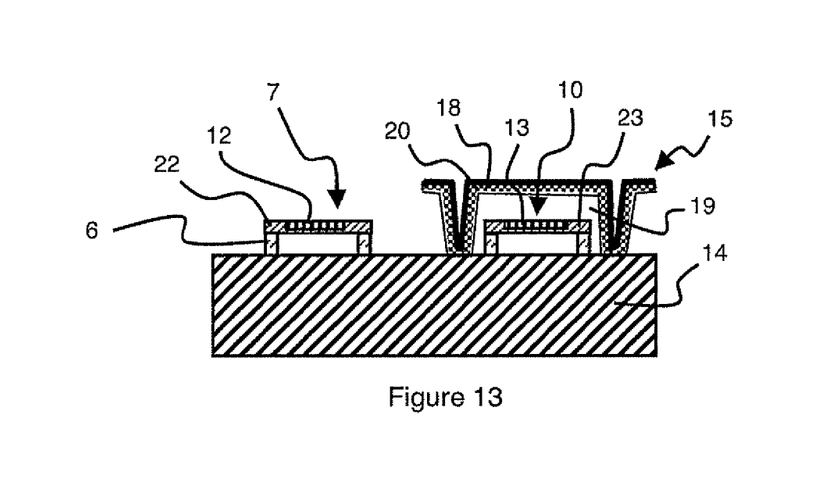

As represented in FIGS. 4 and 13, first and second layers 26 and 27 formed in recess 25 thus constitute the side walls of cover 15 resting on substrate 14. The side walls of cover 15 advantageously have a thickness comprised between 0.1 µm and 2.5 µm.

Figure 12:
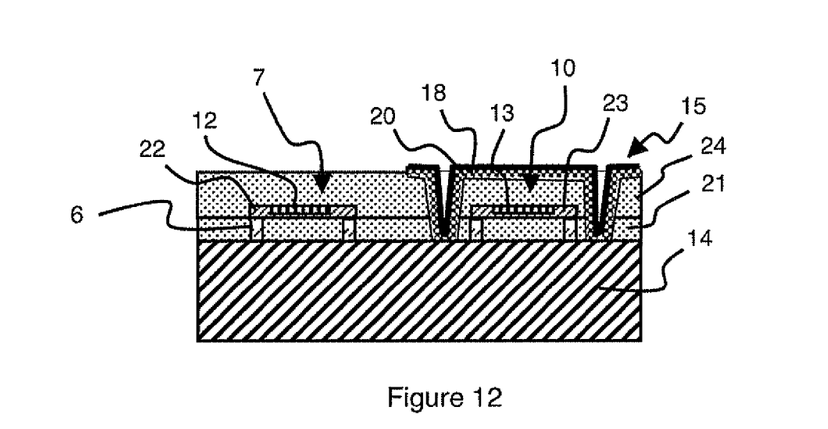

As represented in FIG. 12, etching of layers 26 and 27 is then performed facing the location of active bolometer 7 in order to form cover 15 which is only facing the location of reference bolometer 10. Cover 15 is for example delineated by chemical or plasma etching methods, or by a lift-off process.

Finally, first and second sacrificial layers, respectively 21 and 24, are then etched to obtain the detection device having an active bolometer 7 and a reference bolometer 10 on the same substrate 14 as well as an integrated cover 15 behaving as a black body (FIG. 13).

Etching of sacrificial layers 21 and 24 is preferably performed in a single step by any known method. To facilitate this last step, openings (not shown) can be provided in the thickness of cover 15. The size of the openings has to be sufficiently small not to disturb the functions of cover 15. Etching of sacrificial layers 21 and 24 releases closed cavity 19.

According to an alternative embodiment that is not represented, the detection device comprises a single reference bolometer 10 for several identical active bolometers 7.

Figure 14:
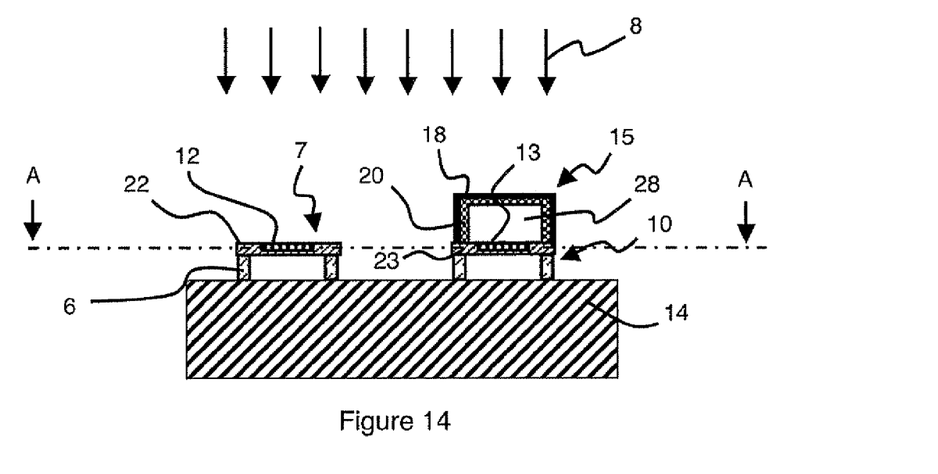
FIG. 14 schematically represents a detection device according to a particular embodiment of the invention, in cross-section.

According to an alternative embodiment represented in FIG. 14, when reference bolometer 10 has an insulating structure with microbridges comprising anchorage points 6, cover 15 can press not on substrate 14 but on anchorage points 6 of reference bolometer 10. As illustrated in FIG. 14, cover 15 presses on at least two of anchorage points 6 of reference bolometer 10. Cover 15 and bolometric plate 23 of reference bolometer 10 form an open cavity 28. Open cavity 28 is delineated by cover 15 at the top part (at the top in FIG. 14) and by a plane AA at the bottom part (at the bottom in FIG. 14). Plane AA passes via anchorage points 6 forming a support. When anchorage points 6 are in the same plane as bolometric plate 23, plane AA also passes via bolometric plate 23 (FIG. 14). Cover 15 does not cover reference bolometer 10 but only second sensitive element 13 without being in contact with the latter.

The method for producing such a device differs from the previous embodiment in that recess 25 is produced by etching facing anchorage points 6 of reference bolometer 10. After etching, first and second layers 26 and 27 deposited in recesses 25 constitute the side walls of cover 15 resting on anchorage points 6 of reference bolometer 10.

This alternative embodiment in particular reduces the overall dimensions and the volume required to produce cover 15. This alternative embodiment is preferred when etching of first and second sacrificial layers 21 and 24 is particularly difficult.

Figure 15:
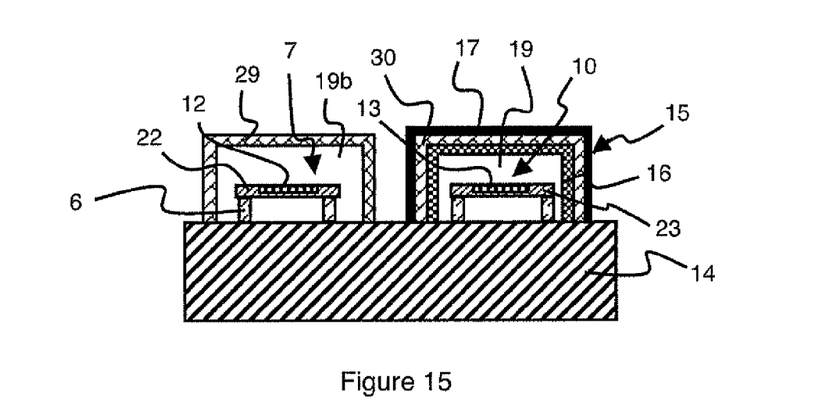
FIG. 15 schematically represents a detection device according to another particular embodiment, in cross-section.

According to another particular embodiment represented in FIG. 15, the detection device differs from the previous embodiment by the fact that active bolometer 7 is encapsulated by a capsule 29 and that cover 15 of reference bolometer 10 has a multilayer absorbent structure of Fabry-Perrot type. Cover 15 in particular comprises a support layer 30 constituted by a material transparent to the electromagnetic radiation emitted by reference bolometer 10 and arranged between absorbent layer 20 and reflecting shield 18.

Support layer 30, outer wall 16 and inner wall 17 form a resonant cavity. The resonant cavity absorbs any electromagnetic radiation that may be emitted by reference bolometer 10. Support layer 30 is constituted by a material transparent to the electromagnetic radiation emitted by reference bolometer 10.

Capsule 29 encapsulates active bolometer 7 and is constituted by a material transparent to electromagnetic radiation 8 advantageously identical to the transparent material of support layer 30.

As represented in FIG. 15, support layer 30 forms an envelope preferably having an identical shape to that of capsule 29.

Capsule 29 totally envelops active bolometer 7 so as to form a closed cavity 19b in which active bolometer 7 is housed. Closed cavity 19b is delineated at the top part by capsule 29 (at the top in FIG. 15) and by substrate 14 at the bottom part (at the bottom in FIG. 15).

Capsule 29 is Transparent to Incident Electromagnetic Radiation.

Absorbent layer 20 is formed by least one resistive absorbent material having a suitable squared resistance preferably chosen from titanium nitride and nichrome. Absorbent layer 20 forms an absorbent cavity at the level of cover 15. The resistive absorbent material is placed facing reference bolometer 10 and advantageously has a impedance comprised between 376 and 377 Ω.squared, preferably equal to 376.8 Ω.squared.

The transparent material of capsule 29 and/or of support layer 30 is chosen from single-crystal, polycrystalline or amorphous silicon, single-crystal or polycrystalline germanium and SiGe alloys.

The thickness d of support layer 30 depends on the wavelength λ of the electromagnetic radiation emitted by reference bolometer 10 and on the optical index n of support 30 layer according to the following equation (3):

$$d=\lambda/4n \quad (3)$$

Support layer 30 supports reflecting shield 18, which is advantageously made from metal. For example, to produce a cover 15 presenting a maximum absorption at 14 μm, the thickness of a support layer 30 made from amorphous silicon inserted between an absorbent layer 20 constituted by a resistive absorbent material and a reflecting shield 18, for example made from aluminum or an aluminum-based alloy, has to be 1 μm. Such a structure then presents an emissivity of 0.8 around 300K, close to that of a black body (equal to 1).

This structure is particularly suitable for the vacuum microencapsulation technology, the materials constituting cover 15 being commonly used in this field. The device for detecting electromagnetic radiation described in the foregoing can be fabricated in the scope of a vacuum encapsulation method.

A particular embodiment of a device for detecting electromagnetic radiation comprising an active bolometer 7 and a reference bolometer 10, according to FIG. 15, will be described in greater detail with regard to FIGS. 16 to 21.

Figure 16:
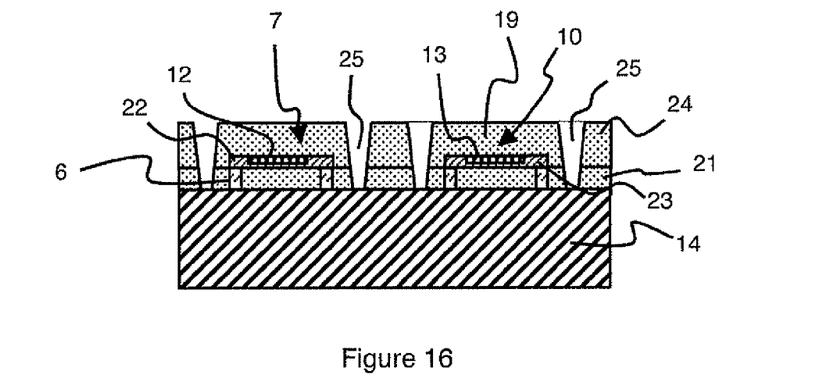
FIGS. 16 to 21 schematically represent the different steps of a fabrication method of the detection device according to FIG. 15, in cross-section.

As represented in FIG. 16, the method for producing such a detection device differs mainly from the previous embodiment in that recess 25 is made in such a way as to form a continuous trench surrounding reference bolometer 10 and also a trench surrounding active bolometer 7.

Figure 17:
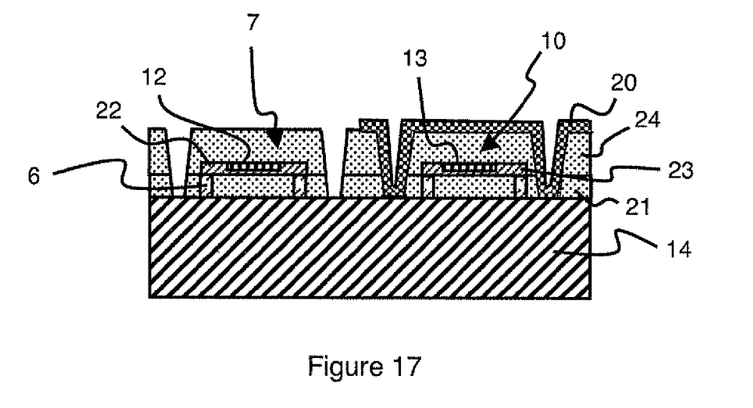

Second layer 27 of absorbent material is then deposited and etched, by means of any known method, facing the location of active bolometer 7 to form absorbent layer 20 of cover 15 (FIG. 17).

A third layer (not shown) of transparent material is then deposited so as to cover recess 25 and absorbent layer 20 and is then etched by means of any known method to form support layer 30.

Figure 18:
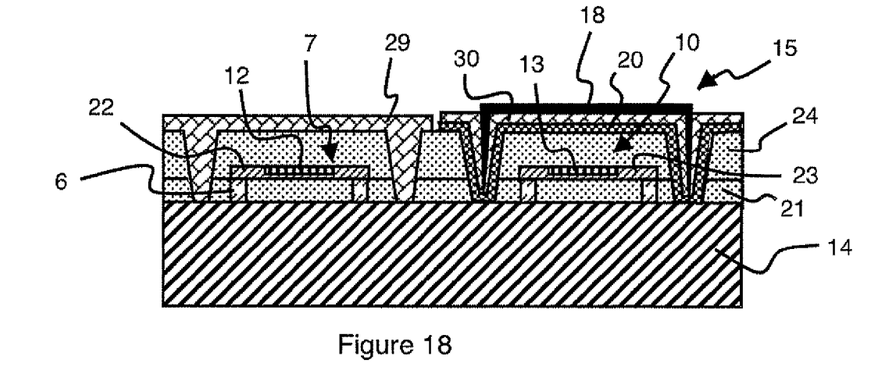

First layer 26 is then deposited and etched so as to constitute reflecting shield 18 (FIG. 18).

Figure 19:
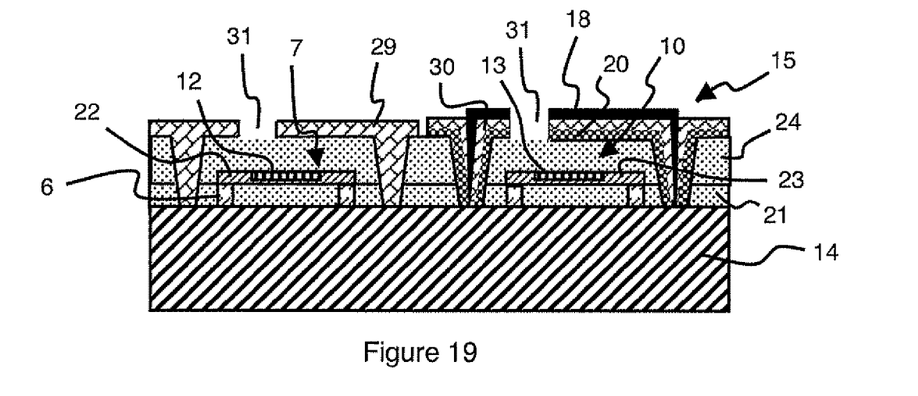

Holes 31 are made, either successively or simultaneously, in capsule 29 and cover 15 through reflecting shield 18, support layer 30 and absorbent layer 20 so as to subsequently form a releasing and pumping channel 32 for encapsulation of the active and reference bolometers, respectively 7 and 10 (FIG. 19).

Figure 20:
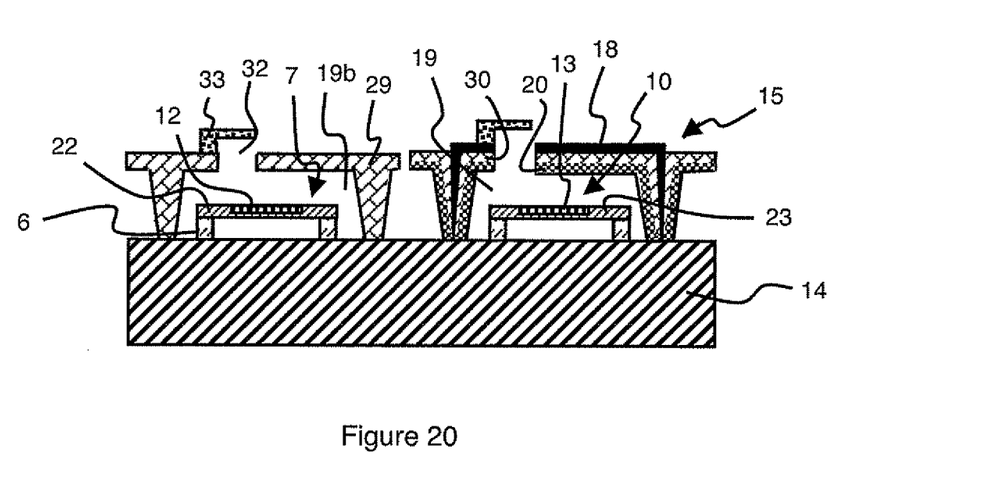
Figure 21:
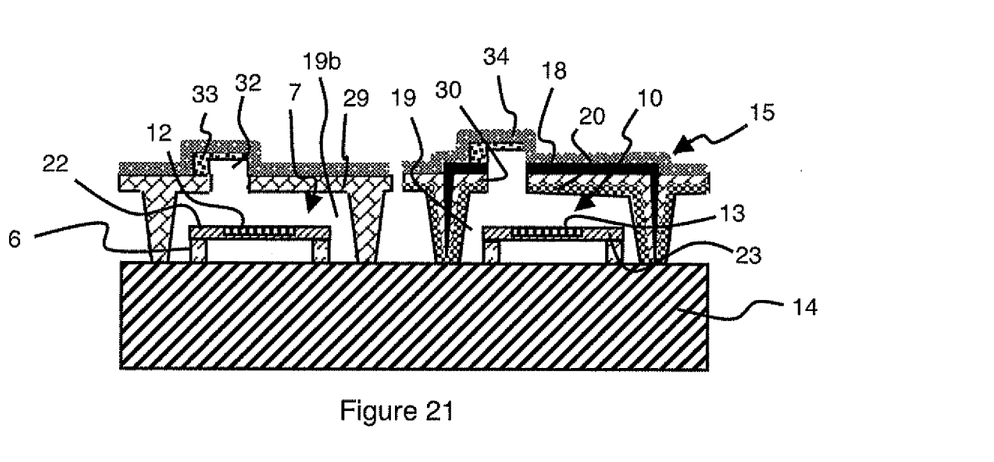

The steps represented in FIGS. 20 and 21 consist in producing a venting channel 33 (FIG. 20), by means of a conventional method, and in then encapsulating active and reference bolometers, respectively 7 and 10, in a vacuum by deposition of one or more sealing layers 34 (FIG. 21). The sealing layers seal off vent 33 and perform an antireflection function for active bolometer 7.

First and second sacrificial layers, respectively 21 and 24, are then etched by means of any known method, thereby releasing cavities 19 and 19b respectively of cover 15 and of capsule 29.

A getter (not shown) can possibly be incorporated in cavities 19 and 19b respectively of cover 15 and of capsule 29. In this case, the getter has to be activated, conventionally by heat treatment, before sealing of bolometers 7 and 10.

The device for detecting electromagnetic radiation according to the invention enables the self-heating component of the signal delivered by the active bolometer, noted $S_a$, to be eliminated and the signal of the scene emitting electromagnetic radiation 8 to be amplified to the utmost. Reference bolometer 10 is identical from an electrothermal point of view to active bolometer 7 and is blind to electromagnetic radiation 8, in particular for IR.

This detection device is promising as it enables the thermal behaviour of active bolometer 7 during the biasing pulse to be reproduced identically, the signal from reference bolometer 10, noted $S_r$, containing the same offset and self-heating signal components. The radiative environment of reference bolometer 10 emulates that of active bolometer 7 in optimized manner, thereby enabling the offset current to be optimally subtracted. In this way, once the signals from these bolometers 7 and 10 have been subtracted, the resulting signal noted $S_u$ corresponds solely to the contribution of the scene and will then be able to be amplified by the rest of the read chain.

Figure 22:
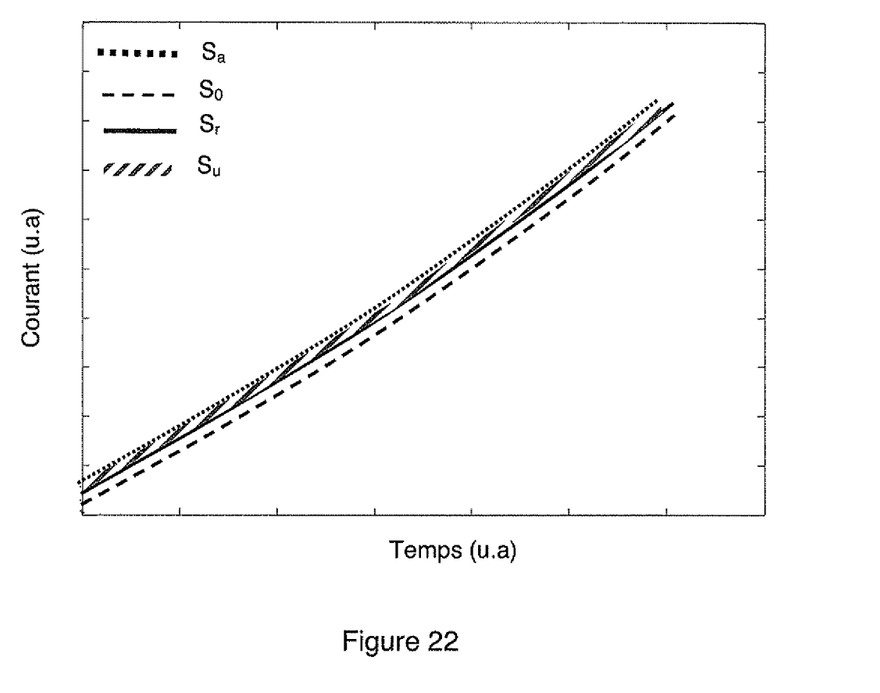
FIG. 22 represents the variation of the current versus time of a detection device according to the invention and of a device of the prior art.

As represented in FIG. 22, the variations of the signal from active bolometer 7 and from reference bolometer 10, respectively $S_a$ and $S_r$, during the biasing phase, show that the signal from reference bolometer 10 follows that of active bolometer 7. In comparison with signal $S_0$ from a reference bolometer only having a metal shield according to the prior art, the presence of an offset current residual of approximately 1% is observed. The integrated signal will then be composed of a non-useful part not containing information on the scene.

For typical bias currents and gains of conventional IR imagery devices, this residual can reach 30% of the output range of the devices. The available excursion of the signal to image the scene is consequently reduced. The distinctive characteristics of the device for detecting electromagnetic radiation of the invention enable this residual to be eliminated or, at least, greatly reduced. The device for detecting electromagnetic radiation according to the invention thereby optimizes skimming of the offset current and enables the available dynamic range of the scene to be increased.

The invention claimed is:

1. A device for detecting electromagnetic radiation that comprises on a single substrate:
    an active bolometer equipped with a first element sensitive to said electromagnetic radiation,
    a reference bolometer identical to the active bolometer, equipped with a second element sensitive to said electromagnetic radiation,
    a cover having an outer wall and an inner surface facing towards the second sensitive element, said cover covering at least the part of the second sensitive element exposed to the electromagnetic radiation and arranging an empty space separating the second sensitive element and the inner surface and,
    a reflecting shield forming at least a part of the outer wall exposed to said electromagnetic radiation,
    wherein the entire inner surface of the cover is constituted by an absorbent layer, said layer being made from a material absorbing at least the thermal radiations emitted by the second sensitive element.

2. The device according to claim 1, wherein the cover completely encapsulates the second sensitive element.

3. The device according to claim 1, wherein the cover presses on the substrate.

4. The device according to claim 3, wherein the cover, with the substrate, forms a closed cavity in which the reference bolometer is housed.

5. The device according to claim 1, wherein the reference bolometer has an insulating microbridge structure comprising anchorage points and the cover presses on at least two of said anchorage points.

6. The device according to claim 1, wherein the absorbent layer is a multi-layer.

7. The device according to claim 1, wherein the absorbent layer is formed by at least one porous metallic absorbent material chosen from black gold, platinum, silver and chromium.

8. The device according to claim 1, wherein the absorbent layer is formed by at least one polymer material containing graphite.

9. The device according to claim 1, wherein the absorbent layer is formed by at least one resistive absorbent material chosen from titanium nitride and nichrome.

10. The device according to claim 1, wherein the cover comprises a support layer arranged between the absorbent layer and a reflecting shield and the active bolometer is encapsulated by a capsule, said support layer being constituted by a material transparent to the electromagnetic radiation emitted by the reference bolometer.

11. The device according to claim 10, wherein the transparent material of the support layer is chosen from single-crystal, polycrystalline or amorphous silicon, single-crystal or polycrystalline germanium and SiGe alloys.

12. The device according to claim 1, wherein the cover is 0.5 μm-5 μm above the reference bolometer.

13. A device for detecting electromagnetic radiation that comprises on a single substrate:
    an active bolometer equipped with a first element sensitive to said electromagnetic radiation,
    a reference bolometer identical to the active bolometer, equipped with a second element sensitive to said electromagnetic radiation,
    a cover having an outer wall and an inner wall facing towards the second sensitive element, said cover covering at least the part of the second sensitive element exposed to the electromagnetic radiation and arranging an empty space separating the second sensitive element and the inner wall and,
    a reflecting shield forming at least a part of the outer wall exposed to said electromagnetic radiation,
    wherein the inner wall of the cover is constituted by an absorbent layer, said layer being made from a material absorbing at least the thermal radiations emitted by the second sensitive element, and
    wherein the reference bolometer has an insulating microbridge structure comprising anchorage points and the cover presses on at least two of said anchorage points.

* * * * *